US008759728B2

(12) United States Patent
Tassan-Mangina et al.

(10) Patent No.: US 8,759,728 B2
(45) Date of Patent: Jun. 24, 2014

(54) APPARATUS FOR COOKING FOOD PRODUCTS ON BOTH SIDES THEREOF

(75) Inventors: Franco Tassan-Mangina, Marsure (IT); Marino Fadelli, Colle Umberto (IT); Fabio Sinatra, Cervignano (IT); Marco Ulian, Flumicello (IT); Erika Menosso, Chions (IT); Michele Toppano, Mereto di Tomba (IT); Alessandro Morassut, Sacile (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 960 days.

(21) Appl. No.: 12/742,440

(22) PCT Filed: Nov. 13, 2008

(86) PCT No.: PCT/EP2008/009577
§ 371 (c)(1),
(2), (4) Date: Nov. 30, 2010

(87) PCT Pub. No.: WO2009/065518
PCT Pub. Date: May 28, 2009

(65) Prior Publication Data
US 2011/0062151 A1 Mar. 17, 2011

(30) Foreign Application Priority Data

Nov. 20, 2007 (EP) .................................... 07022466

(51) Int. Cl.
*H05B 6/80* (2006.01)
*A47J 36/38* (2006.01)

(52) U.S. Cl.
USPC ........... 219/690; 219/680; 219/725; 219/729; 99/451

(58) Field of Classification Search
USPC ......... 219/730, 731, 732, 734, 725, 728, 401, 219/387, 475, 449.1, 452.11; 99/DIG. 14, 99/451, 341, 375, 377, 391, 400, 339, 349, 99/372, 379, 380; 426/241, 243; 126/261, 126/369, 275 E
See application file for complete search history.

(56) References Cited

U.S. PATENT DOCUMENTS 5,523,548 A * 6/1996 Tsukagoshi et al. .......... 219/695
7,449,665 B2 * 11/2008 Fadelli et al. ................. 219/680

FOREIGN PATENT DOCUMENTS

EP 1714595 10/2006
JP 2004195072 A * 7/2004
WO 9944394 9/1999

OTHER PUBLICATIONS

International Search Report for PCT/EP2008/009577, dated Mar. 25, 2009, 2 pages.

*Primary Examiner* — Quang Van
(74) *Attorney, Agent, or Firm* — Pearne & Gordon LLP (57) ABSTRACT

An apparatus for cooking food products on both sides which has a food-support surface that is transparent to both microwave and infrared radiation, an electric heating device, and a microwave generator. The microwave generator is connected to a waveguide cavity for irradiating the food products. The apparatus also has a food-contact heating surface that, together with the food-support surface, forms a cooking chamber capable of retaining the microwaves inside. The electric heating device has a shielded resistor with the external shield electrically connected to ground. The apparatus has a partition element made of thermal-insulating and microwave-transparent material, a portion of which is below the shielded resistor to separate the resistor from the microwave generator. The waveguide cavity has a microwave launch aperture underneath the partition element. The microwaves exit the cavity and pass through the partition element, the shielded resistor, and the food-support surface and radiate into the cooking chamber.

19 Claims, 14 Drawing Sheets

APPARATUS FOR COOKING FOOD PRODUCTS ON BOTH SIDES THEREOF

DESCRIPTION

The present invention refers to an improved kind of griddle or plate for cooking food products in a quick manner on both sides thereof.

Widely known in the art are currently broilers, or griddles, that are used to cook food products of the most varied kind, such as hamburgers, toasted rolls, meat in general, and the like.

EP 1 714 595, filed by this same Applicant, discloses an apparatus for cooking food products on both sides thereof, comprising a base member associated to a bottom heating surface adapted to support food products to be cooked, an upper member associated to a top heating surface and joined in an articulated manner to the base member so that, when the upper member is displaced towards the base member, the top heating surface comes to lie opposite to the bottom heating surface so as to enclose the food products therebetween.

The upper member is adapted to close in onto the base member so as to form a cooking cavity containing said heating surfaces, the base member comprising a microwave generator adapted to irradiate the food products being enclosed between said heating surfaces, wherein the cooking cavity defines a radiation shield capable of retaining the microwaves inside said cooking cavity itself.

The microwave generator is connected to a waveguide cavity closed at the top by a reflector arranged close to the bottom heating surface in a position below the latter. The reflector is provided with a plurality of slots, through which the microwaves are able to rise up out of the waveguide cavity to pass through microwave-transparent portions of the bottom heating surface and radiate into the cooking cavity.

This arrangement produces an ample shied effect opposing the microwave propagation and preventing in a clearly appreciable manner the same microwaves from being able to fully efficiently and effectively reach the food product placed upon said bottom heating surface.

Needless to say that such main problem is further aggravated by the drawbacks deriving from electromagnetic coupling and interference problems brought about by such unacceptable shielding effect created by the slot.

Known from the disclosure in WO 99/44394 is an apparatus for cooking foods by both traditional electric heating and microwave heating; however, the food products being cooked—although fully capable of being baked, i.e. grilled in a traditional manner, owing to the two mutually opposing grilling/heating surfaces being able to be displaced into contacting the food to be cooked—cannot practically being treated with the emission of microwaves in any satisfactorily even manner, since such microwave emission takes place in a direction that is parallel to said grilling/heating surfaces themselves and thereby causing an uneven microwave distribution.

It is therefore a main object of the present invention to provide an apparatus for cooking food products on both sides thereof which is effective in doing away with the above-noted drawbacks of the cited prior art.

According to the present invention, this aim, along with further ones that will become apparent from the following disclosure, is reached in an apparatus for cooking food products on both sides incorporating the features and characteristics as defined and recited in the claims appended hereto.

Features and advantages of the present invention will anyway be more readily understood from the description that is given below by way of non-limiting example with reference to the accompanying drawings, in which.

With reference to the above-cited Figures, the apparatus for cooking food products on both sides thereof, as generally indicated with the reference numeral 1, comprises:

a base member 2 comprising a food-support surface 3 transparent to both microwave and infrared radiation, an electric heating device 4 and at least one microwave generator 5 connected to a waveguide cavity 6 for irradiating the food products, an upper member 7 comprising a food-contact heating surface 8 and adapted to close in onto the base member 2 so as to form a cooking chamber 9 enclosing said surfaces 3, 8 and capable to retaining the microwaves therewithin.

The electric heating device comprises at least one shielded resistor 10 having the external shield 11 electrically connected to ground.

The apparatus is provided with a partition element 12 made of thermally insulating and microwave-transparent material arranged in a position below the shielded resistor 10 for separating the latter from the microwave generator 5.

Further, the waveguide cavity 6 comprises a microwave launch aperture 13 arranged underneath the partition element 12, through which the microwaves are adapted to rise up out of the waveguide cavity 6 to pass thorough the partition element 12, the shielded resistor 10, the food-support surface 3 and radiate into the cooking chamber 9.

The base member 2 comprises a compartment provided to accommodate the microwave generator 5, the power-supply unit for the same generator and the control electronics for both the generator and the power supply. The food-support surface 3 covers and substantially closes the area on top of the base member 2, so that the microwave generator 5, the power supply and the control electronics are located in said accommodating compartment below the food-support surface 3.

The upper member 7 is associated to the food-contact heating surface 8 and pivotally joined to the base member 2 so that the upper member 7 is movable, relative to said base member 2, between an open inoperative condition, in which the food-support surface 3 of the base member 2 is accessible from the outside for the food products to be cooked to be capable of being laid thereupon, and a closed cooking condition, in which the upper member 7 is closed onto the base member 2 so as to define the cooking chamber 9 containing the food-support surface 3 and the food-contact heating surface 8.

In practise when the upper member 7 is lowered or swung towards the base member 2, the food-contact heating surface 8 moves close to the food-support surface 3 supporting the food to be cooked, so as to enclose the latter therebetween.

The upper member 7 comprises a handgrip member, by means of which it is possible for the same upper member 7 to be raised and lowered between the open inoperative condition and the closed cooking condition as mentioned above.

The kind of movement needed to lower the upper member 7, i.e. the food-contact heating surface 8 onto the food-support surface 3 lying therebelow can for instance be a rotary one about a hinging pin provided on the base member 2 or a simple translational one, or a combination of both. Anyway, these details shall not be explained any further, owing to them being generally and widely known to all those skilled in the art.

The same cooking chamber 9 formed by said base and upper members 2, 7 when closed against each other defines and forms a microwave screen adapted to retain the same microwaves therewithin, i.e. prevent them from leaking outside.

The electric heating device 4 is housed within the base member 2 and arranged under the food-support surface 3, which is made of a material, for example glass-ceramic and most preferably quartz ($SiO_2$, Silica), that is resistant to high temperatures and transparent to both microwave and infrared radiation, so that the heat produced by such electric heating device 4 passes directly on to the food being cooked.

Advantageously, the food-support surface 3 can be coated with a non-stick layer, for example Teflon, to improve cleanability Housed in the base member 2—below the food-support surface 3 and the electric heating element 4—there are the microwave generator 5 of the magnetron type to irradiate the food products enclosed within said surfaces 3 and 8; the waveguide cavity 6 associated to the generator 5, and further a power-supply transformer for the same generator, a cooling fan—powered from said transformer—adapted to cool down said magnetron microwave generator 5. An electronic control panel, with the related electronic controls, is provided on the base member 2 for the different cooking programmes to be set in accordance to the food products to be handled.

An interlock switch is adapted to allow the microwave generator 5 to solely operate when the upper member 7 is correctly closed against the base member 2.

The microwave generator 5 is coupled to at leas a waveguide cavity 6 adapted to guide and to convey the microwave propagation towards the food-support surface 3 from the bottom upwards. In turn, the food-support surface 3 is adapted to let the microwaves pass therethrough so as to hit the food products resting upon said food-support surface 3 inside the cooking cavity 6.

The electric heating device 4 is configured in the form of one or more shielded resistor 10 of the type used in electric oven with the external shield 11 electrically connected to ground in order not to absorb the microwaves and to prevent any electromagnetic coupling and interference problems.

The shielded resistor 10 is placed underneath and substantially in proximity to the food-support surface 3.

The partition element 12 comprises at least a panel made of thermal insulating and microwave transparent material (mineral oxides, for example) which is arranged so as to extend in a position below the shielded resistor 10 for thermally insulating the microwave generator 5 and the other electric/electronic components housed in the base member 2 from the shielded resistor 10.

In practise, the partition element 12 divides or separates the inside of the base member 2 into a first zone or infrared radiation area 14 wherein the shielded resistor 10 is located and into a second zone or area 15 wherein the microwave generator 5, the electric and electronic components (the power-supply transformer, cooling fan, electronic controls) are arranged in order to reduce the heat losses downwards from the infrared radiation area 14 and at the same time to convey the heat generated by the shielded resistor 10 towards the food-support surface 3.

Advantageously, the partition element 12 forms a housing adapted to contain the shielded resistor 10 and, preferably, the partition element 12 is configured as a box-like container in which the shielded resistor 10 is arranged. The box-like container comprises a bottom wall, upward-oriented side walls and further, it is open upwards and arranged so that the food-support surface 3 substantially closes the open side of the box-like container. The food-support surface 3 and the box-like container delimit the infrared radiation area 14 enclosing the shielded resistor 10 so as to ensure a thermal protection of the others members and parts of the apparatus mounted therearound against the heat generated by the shielded resistor 10, while at the same time allowing microwaves to pass therethrough without any attenuating effect whatsoever.

The microwave generator 5 is connected to a microwave cavity 6 adapted to convey the microwave propagation towards the food-support surface 3 and placed in a position below the partition element 12, in the second area 15.

To such purpose, the microwave cavity 6 is provided with a microwave launch aperture 13 through which the microwaves leave (come out of) the same cavity 6. The microwave launch aperture 13 is provided so as to extend underneath the partition element 12 and to face the latter.

In case of the box-like container embodiment, for example, the microwave launch aperture 13 faces and it is arranged under the bottom wall of the box-like container.

In this manner, the microwaves, issued by and propagating from the generator 5, rise up out of the cavity 6 and pass through the partition element 12, the shielded resistor 10 and finally the food-support surface 3 to radiate into the cooking chamber 9.

In other words the microwaves propagate from the bottom upwards through the partition element 12, the shielded resistor 10 and the food-support surface 3 to hit and be absorbed by the food to be cooked placed inside the cooking chamber 9.

Expediently, a microwave reflector 28 is provided between the microwave launch aperture 13 and the food-support surface 3, around the box-like container of the partition element 12, in order to prevent the microwaves rising up out of the cavity 6 from propagating into the second area 15 thereby protecting the electric/electronic components housed in the base member 2.

The microwave reflector 28 is configured as a screen, for example made of a metallic material, encompassing the side walls of the box-like container and extending between the microwave launch aperture 13 and the food-support surface 3.

Further the screen is open upwards so that the food-support surface 3 substantially closes the top open side of the screen and it is also open downwards so as to define a bottom opening connected to the microwave launch aperture 13. The bottom opening of the screen is configured so that the dimensions or size thereof and the dimensions or size of the microwave launch aperture 13 coincide and the screen is arranged so that the bottom opening is directly and fully superimposed on the microwave launch aperture 13.

During the operation of the apparatus, the microwaves leave the cavity 6 through the microwave launch aperture 13, pass directly through the bottom opening of the microwave reflector 28 and then propagate from the bottom upwards through the partition element 12, the shielded resistor 10 and the food-support surface 3.

The microwave reflector confines or delimits the microwave propagation from the microwave launch aperture 13 to the food-support surface 3 inside the infrared radiation area 14.

Advantageously, the microwave reflector 28 is adapted to support the box-like container of the partition element 12.

Preferably, the waveguide cavity 6 in configured as a box-shaped or parallelepiped shaped casing having internal dimensions appropriately sized so as to effectively drive the microwaves generated by a magnetron working at 2450 MHz, i.e. the microwave generator normally used in domestic appliances, microwave oven for example.

Most preferably the waveguide cavity 6 is configured as a parallelepiped shaped casing having a rectangular cross-section with a short side 31 and long side 32.

In a preferred embodiment two waveguide cavities 6, each one connected to a magnetron generator, are provided in the base member 2 and they are arranged sideways one respect to the other with each microwave launch aperture 13 extending in a position below the partition element 12.

Figure 13:
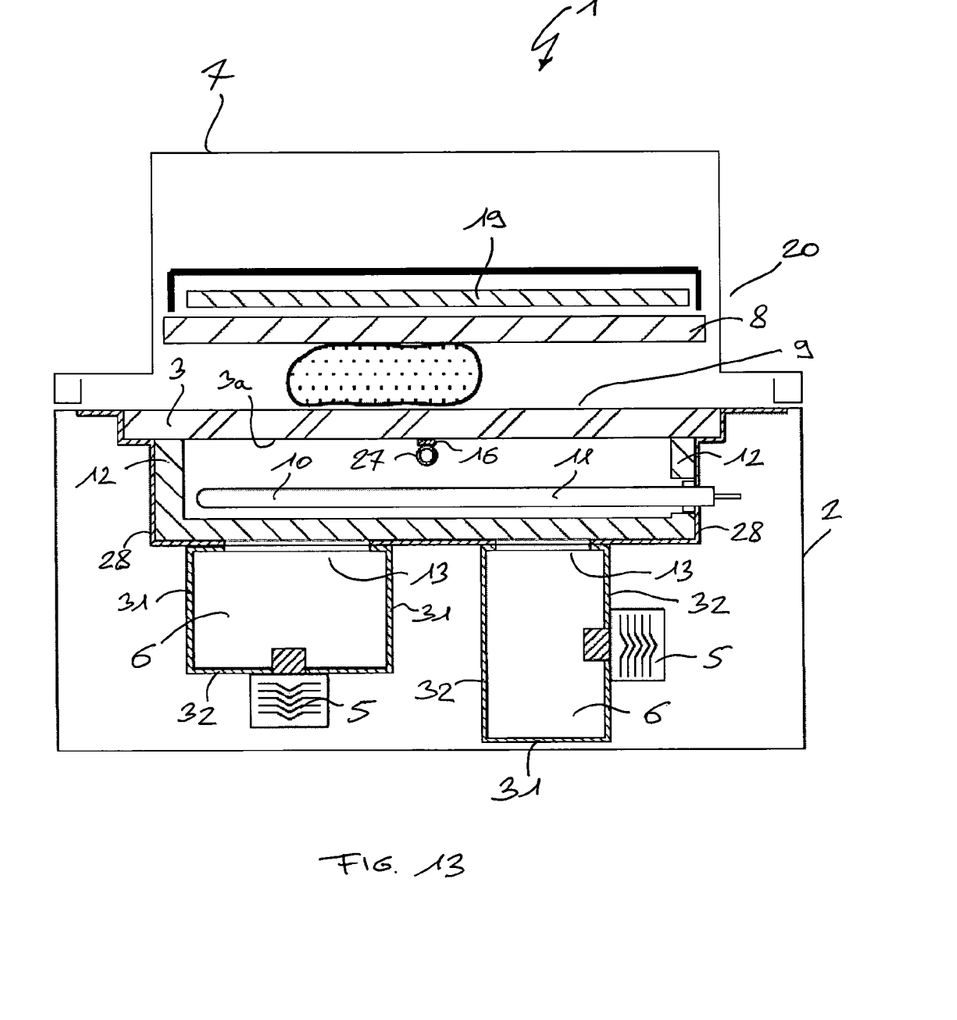
FIG. 13 is a front sectional view of the apparatus according to another embodiment of the present invention.

In a most preferred embodiment one of the two waveguide cavities 6 faces the food-support surface 3 via the long side 32 whereas the other one of the two waveguide cavities 6 faces the food-support surface 3 via the short side 31 as it clearly depicted in FIG. 13. In other words the parallelepiped shaped casings defining the two waveguide cavities 6 are arranged sideways so that the cross-section thereof are 90 degree rotated one respect to the other.

Figure 14:
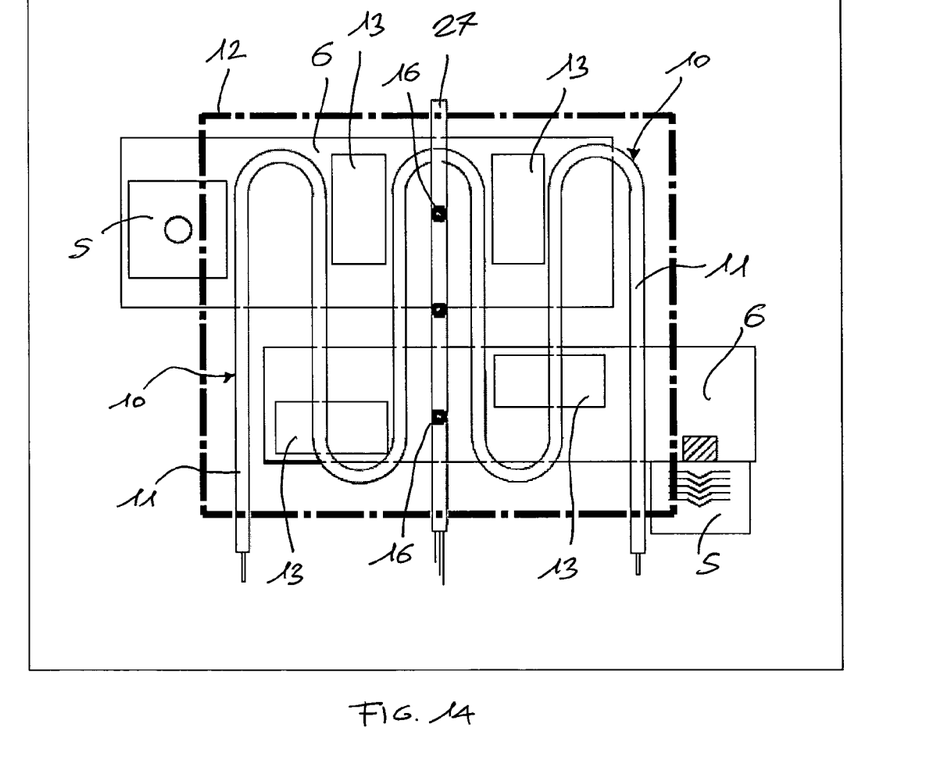
FIG. 14 is a top sectional view of the apparatus shown in FIG. 13.

Further, in a further most preferred embodiment each waveguide 6 comprise at least a pair of microwave launch aperture 13 facing the food-support surface 3 as it is as shown in FIG. 14, such microwave launch apertures 13 being provided through the short side 31 of one the two parallelepiped shaped casings and through the long side 32 of the other of the two parallelepiped shaped casings.

Figure 1:
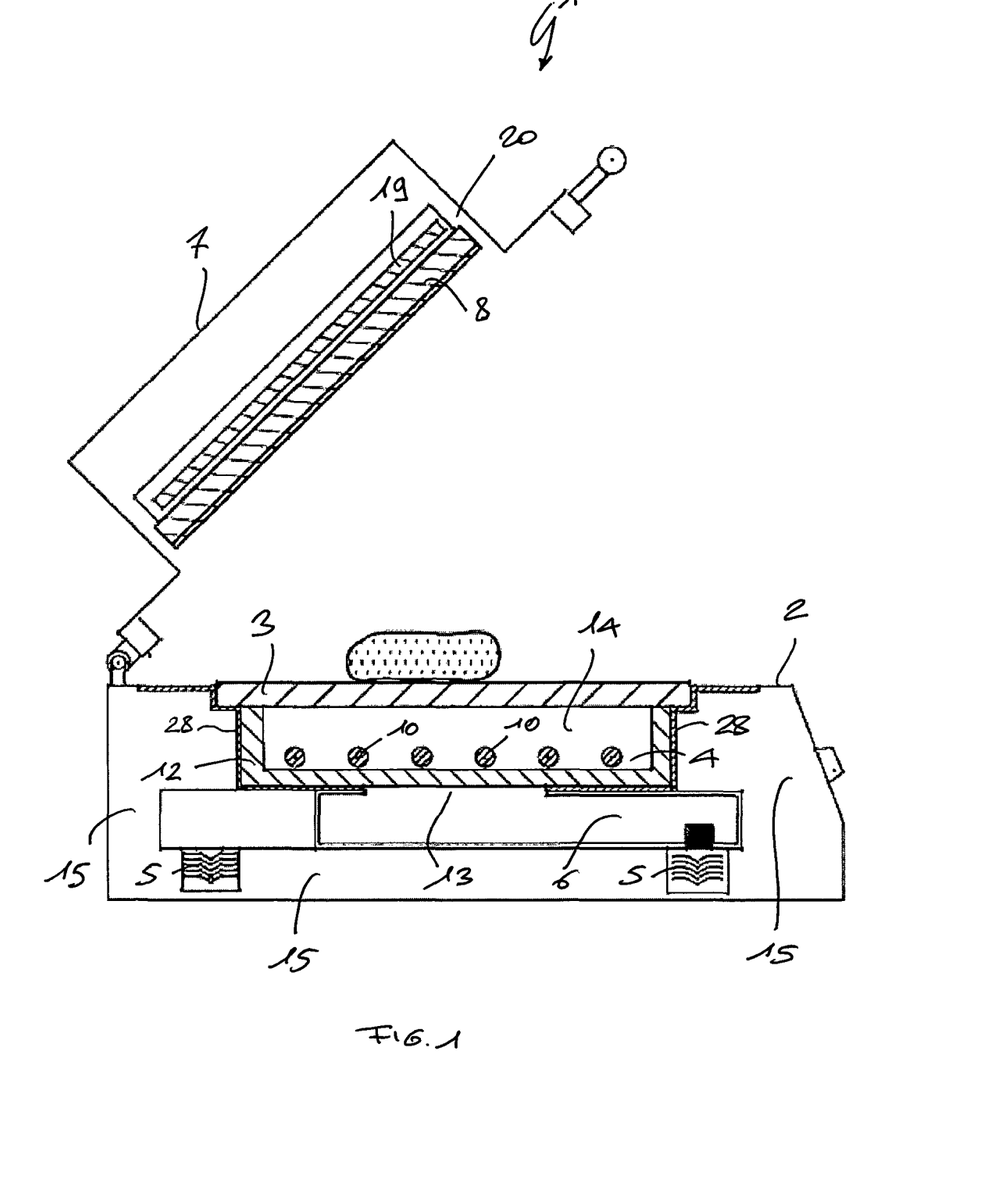
FIG. 1 is a lateral sectional view of a food cooking apparatus according to the present invention, shown in open condition.
Figure 2:
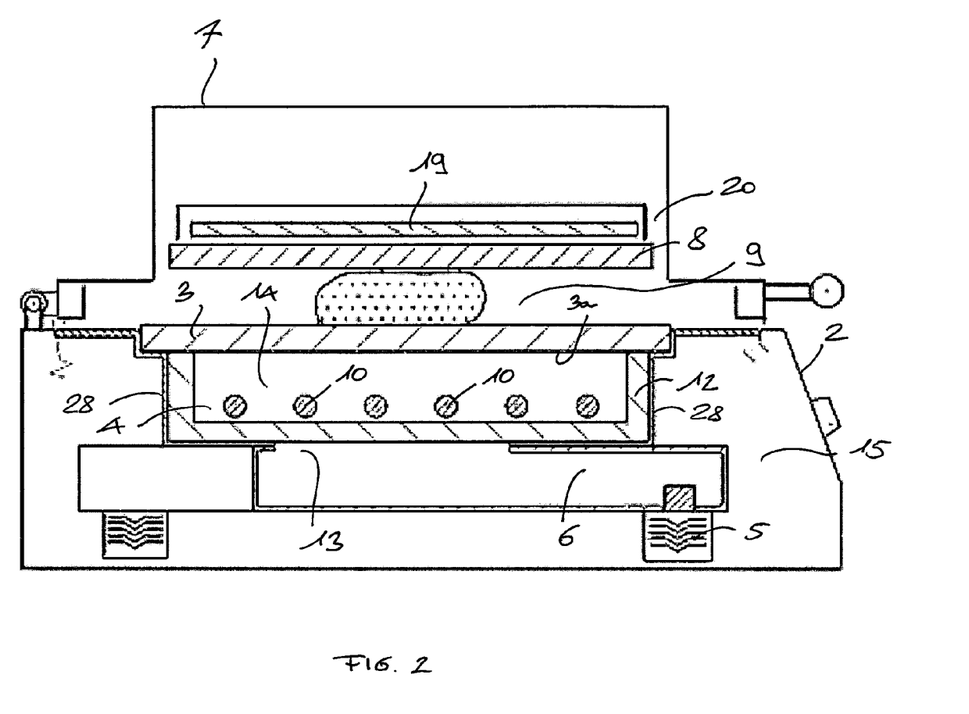
FIG. 2 is a lateral sectional view of the apparatus of FIG. 1 showing the same in closed condition.
Figure 3:
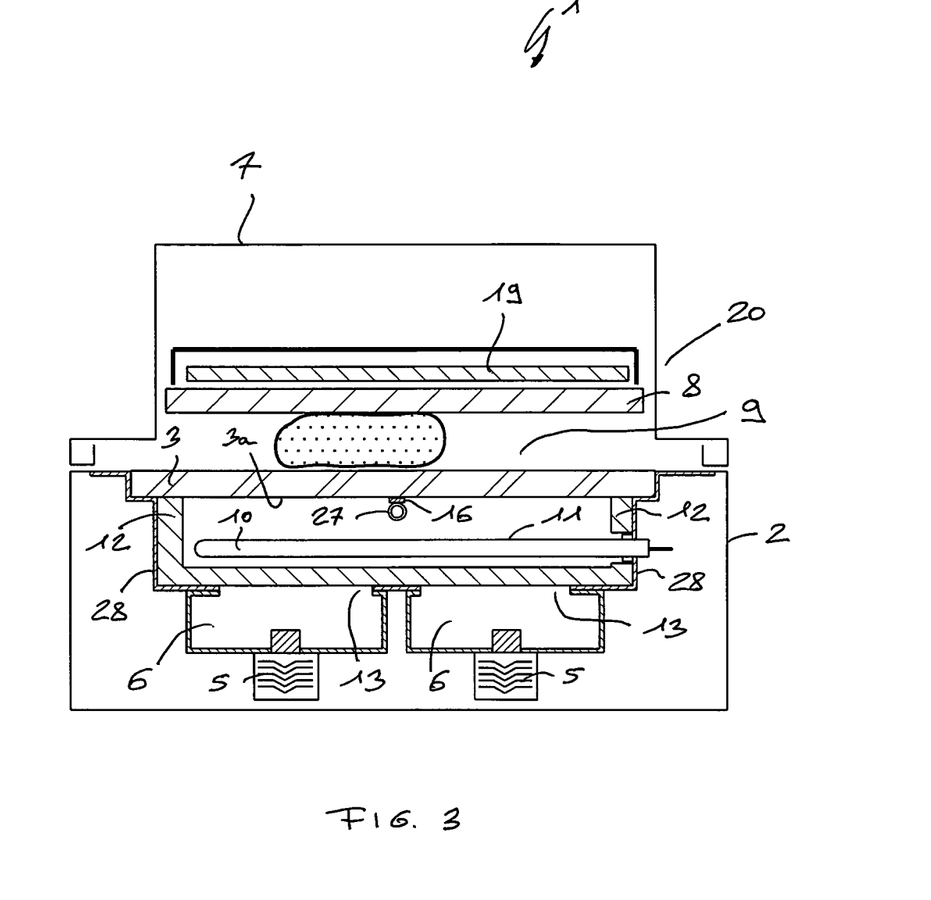
FIG. 3 is a front sectional view of the apparatus shown in FIG. 1.
Figure 4:
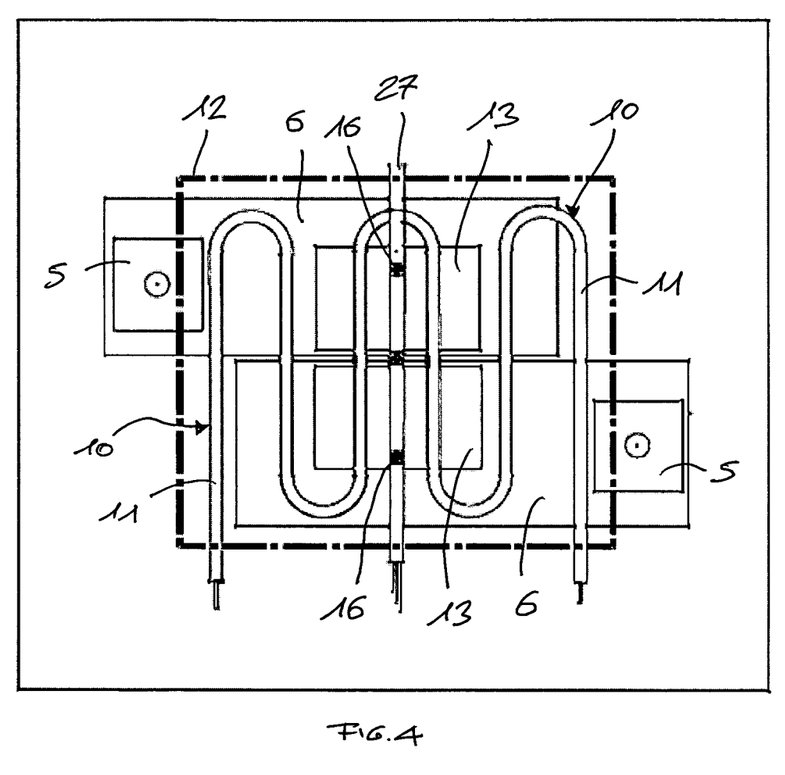
FIG. 4 is a top sectional view of the apparatus shown in FIG. 1.
Figure 5:
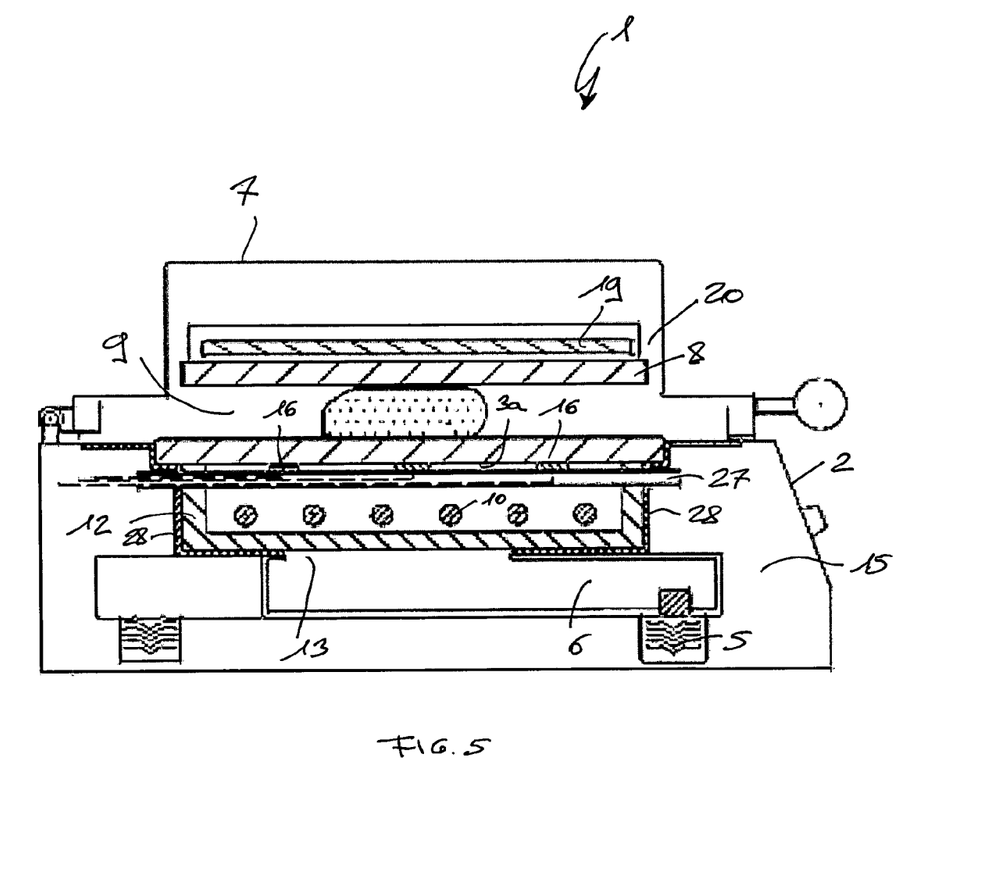
FIG. 5 is a similar view of the apparatus of FIG. 2 showing the temperature sensor and the casing for the connection wires.

The microwave reflector 28 is provided with a bottom opening having the same dimensions as those of the two microwave launch aperture 13 and it is arranged so as to be fully superimposed on the two microwave launch apertures 13, as previously described and represented, for example, in FIG. 3

In a further embodiment, the waveguide cavity 6 is in the shape of substantially a funnel having a tapered portion coupled to the microwave generator 5 and a flared portion opened at the top so as to define the microwave launch aperture 13, through which the microwaves are able to rise up out of the waveguide cavity 6 to pass through the partition element 12, the shielded resistor 10 and the food-support surface 3, as fully explained above.

Figure 6:
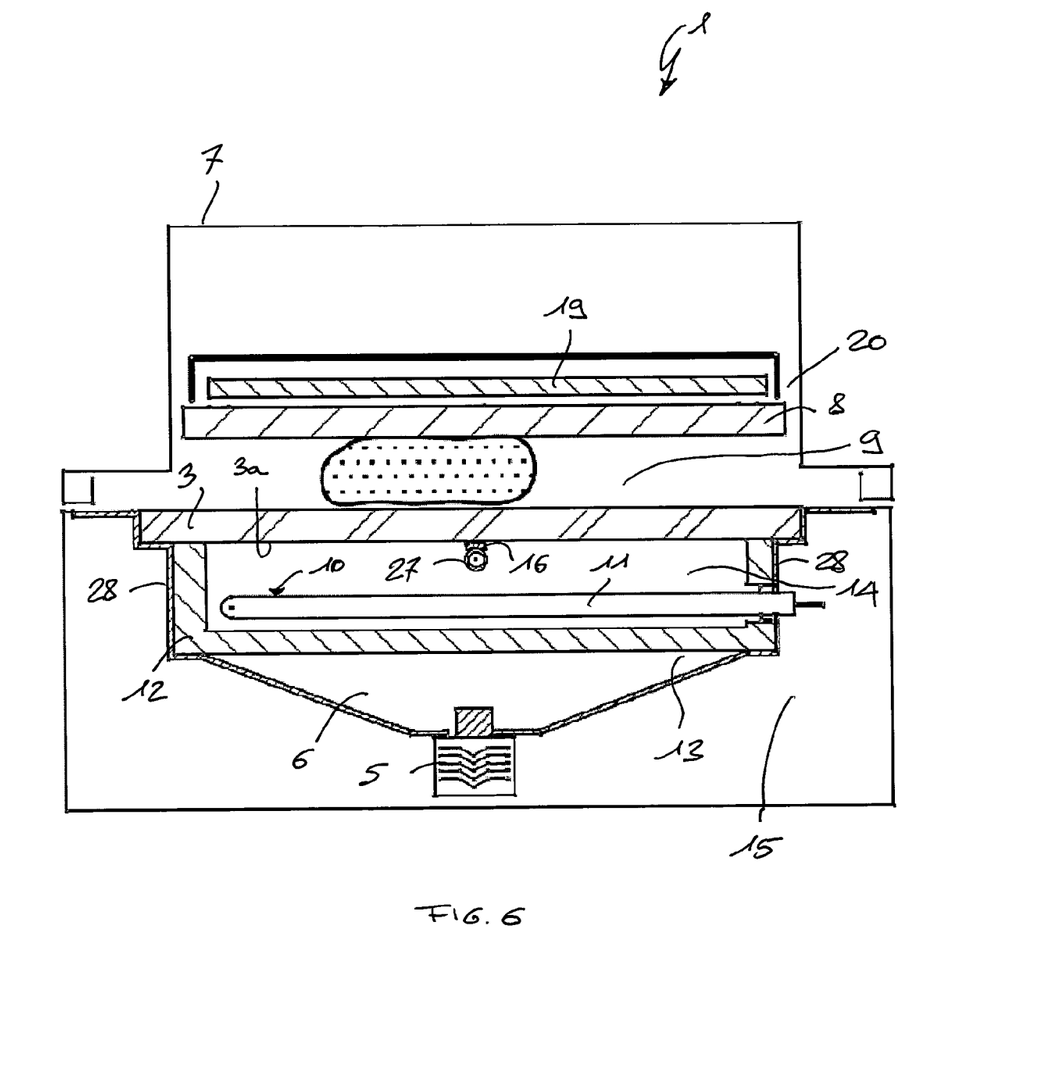
FIG. 6 is a front sectional view of the apparatus according to another embodiment.

Also in this case the microwave reflector 28 is provided with a bottom opening having the same dimensions as those of the microwave launch aperture 13 and it is arranged so as to be fully superimposed on the two microwave launch apertures 13, as previously described and represented in FIG. 6

Advantageously, temperature sensors 16 are provided in contact to the bottom face 3a of the food-support surface 3, i.e. in contact to the face opposite to the one adapted to support the food, for detecting the temperature variations, which are generated by the food when it is placed on the hot food-support surface 3 in order to maintain the cooking temperature.

In fact, since the temperature of the hot food-support surface 3 drops as soon as the food is placed thereupon and the cooking time needs to be very short, the temperature sensors are adapted to quickly detect such temperature variations so that the shielded resistor can be controlled or driven in order to keep the cooking temperature constant.

The electric connection wires of the temperature sensors 16 are arranged inside a metallic casing 27, configured as a tube, which extends parallel to the food-support surface 3 for protecting the wires against microwave interferences A cooking apparatus is in this way provided, which is adapted to process any food product that is placed upon said food-support surface 3 by both thermal effect, i.e. by grilling it under radiated heat, and microwave heating effect.

In fact, upon placing said food product thereupon, all it takes is lowering said upper member 7 so as to close it in on said base member 2 and ensure that the thereby automatically formed cooking chamber 9 features a tightly sealed construction and can in addition be both irradiated, i.e. hit by the infrared radiation emitted by the shielded resistor 10 and by the food-contact heating surface 8 from both opposite sides of the food product being exposed, and reached by the propagating microwaves that pass through the partition element 12, the shielded resistor 10 and the food-support surface 3 in an ascending flow pattern.

As far as the operation of the above-described cooking apparatus according to the present invention, it will be capable of being operated in the microwave-only mode, in the infrared heat-only mode, as well as in the combined mode using both microwaves and infrared heat.

Further and more sophisticated operating modes can in addition be provided, in which the power levels being generated and output can for instance be modulated and regulated in a useful manner. Such operating modes, however, are fully similar to those generally available in combination ovens using microwaves and traditional heat as currently available on the market, so that—owing to them being largely known to and within the abilities of all those skilled in the art—they shall not be explained any further.

Although one and two microwave generators are respectively represented in preferred embodiments, it shall be appreciated that even more than two microwave generators may be provided and used in the inventive apparatus, as well.

Preferably, the food-contact heating surface 8 is movably associated to the upper member 7 by means of at least a moving coupling 17 enabling the food-contact heating surface 8 to move relative to the upper member 7, as to be displaced into positions at different height from the food-support surface 3 in accordance with the size of the food products to be cooked each time. In practise, the food-contact heating surface 8 is movable inside the cooking chamber so that the food-contact heating surface 8 is capable to fit the different height of the food product placed on the food-support-surface.

Advantageously, when the upper member 7 is in open inoperative condition, i.e. lifted from the base member 2, the food-contact heating surface 8 is movable into an extraction position in which the latter is taken out or spaced from the upper member 2 so that the inner housing 18 of the upper member 2 adapted to contain the movable food-contact heating surface 8 is accessible from the outside to be cleaned.

Figure 8:
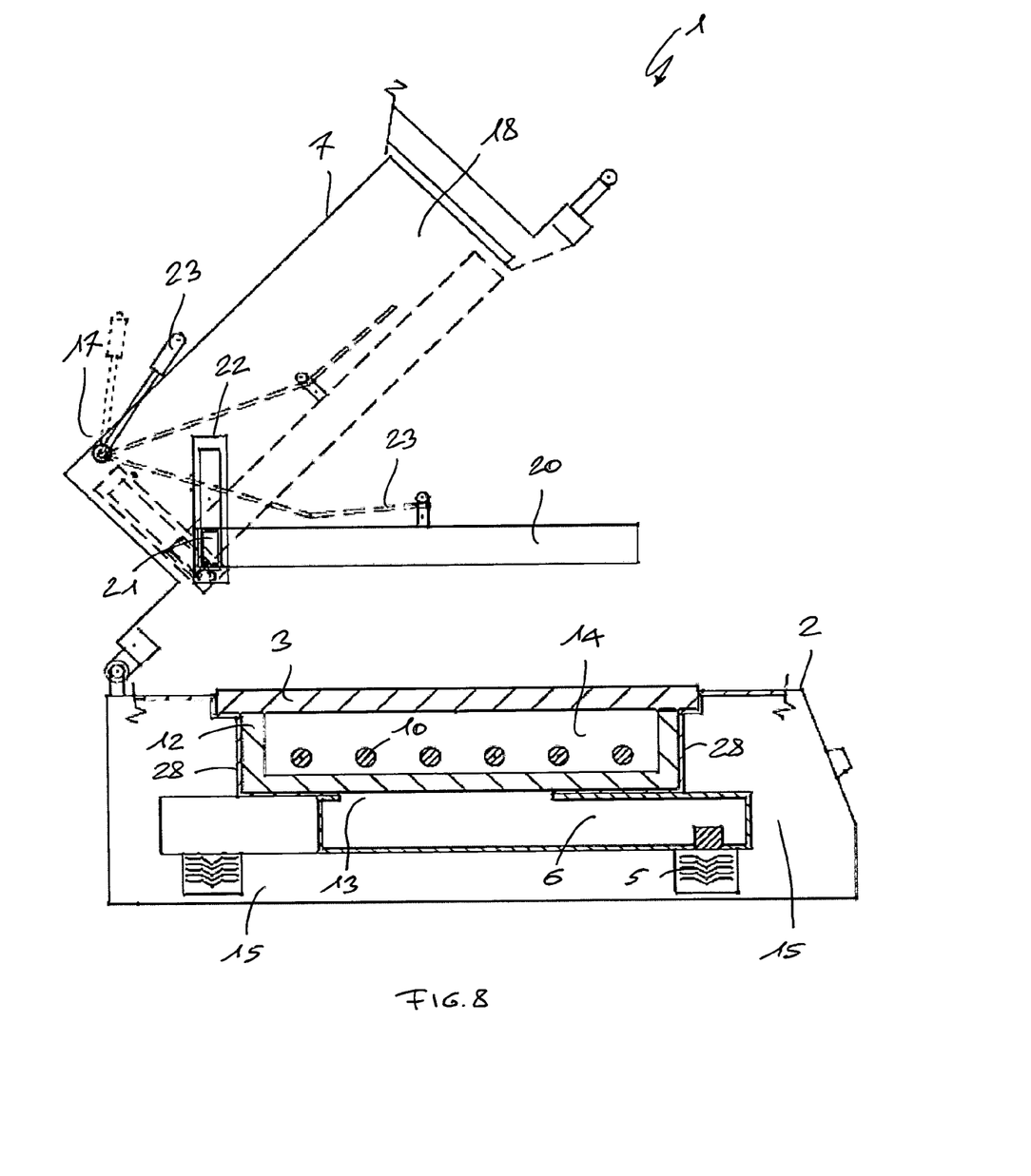
FIG. 8 is a view similar to FIG. 7, the apparatus being in open condition.
Figure 10:
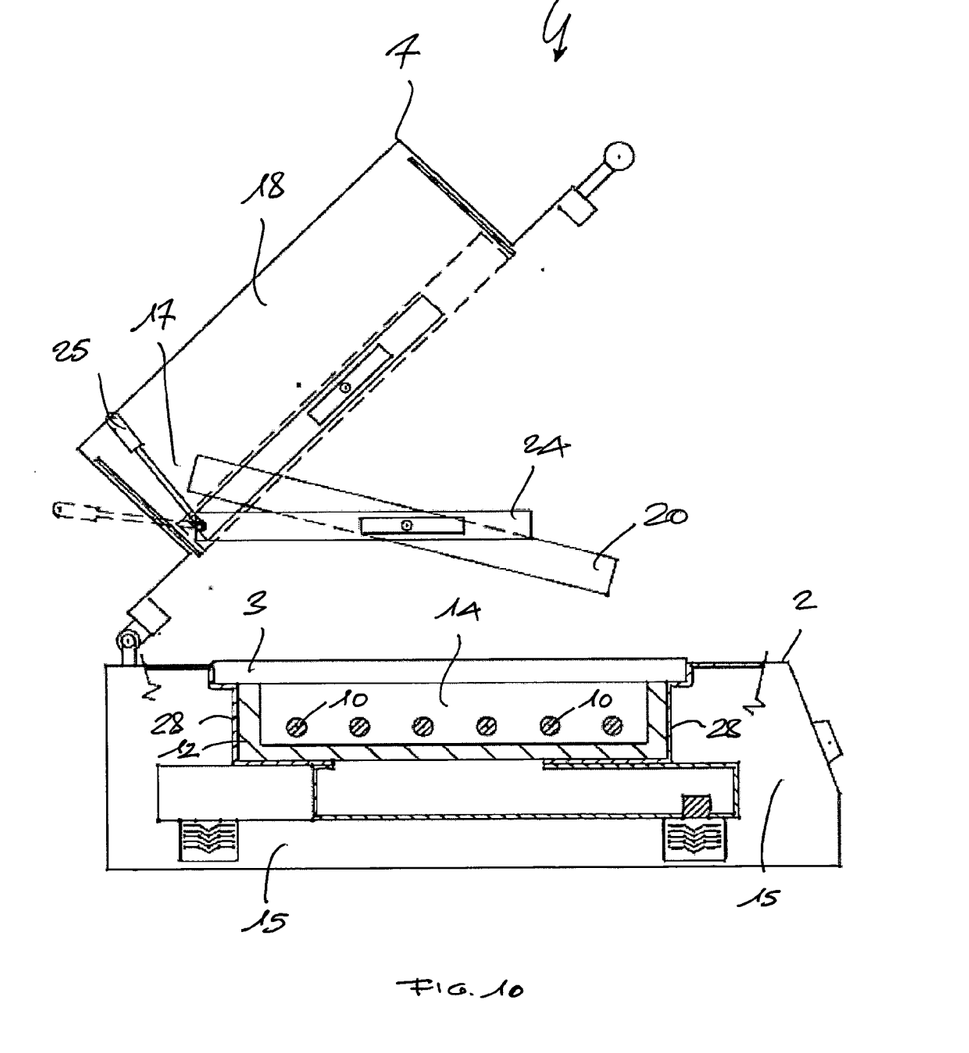
FIG. 10 is a view similar to FIG. 9, the apparatus being in open condition.
Figure 12:
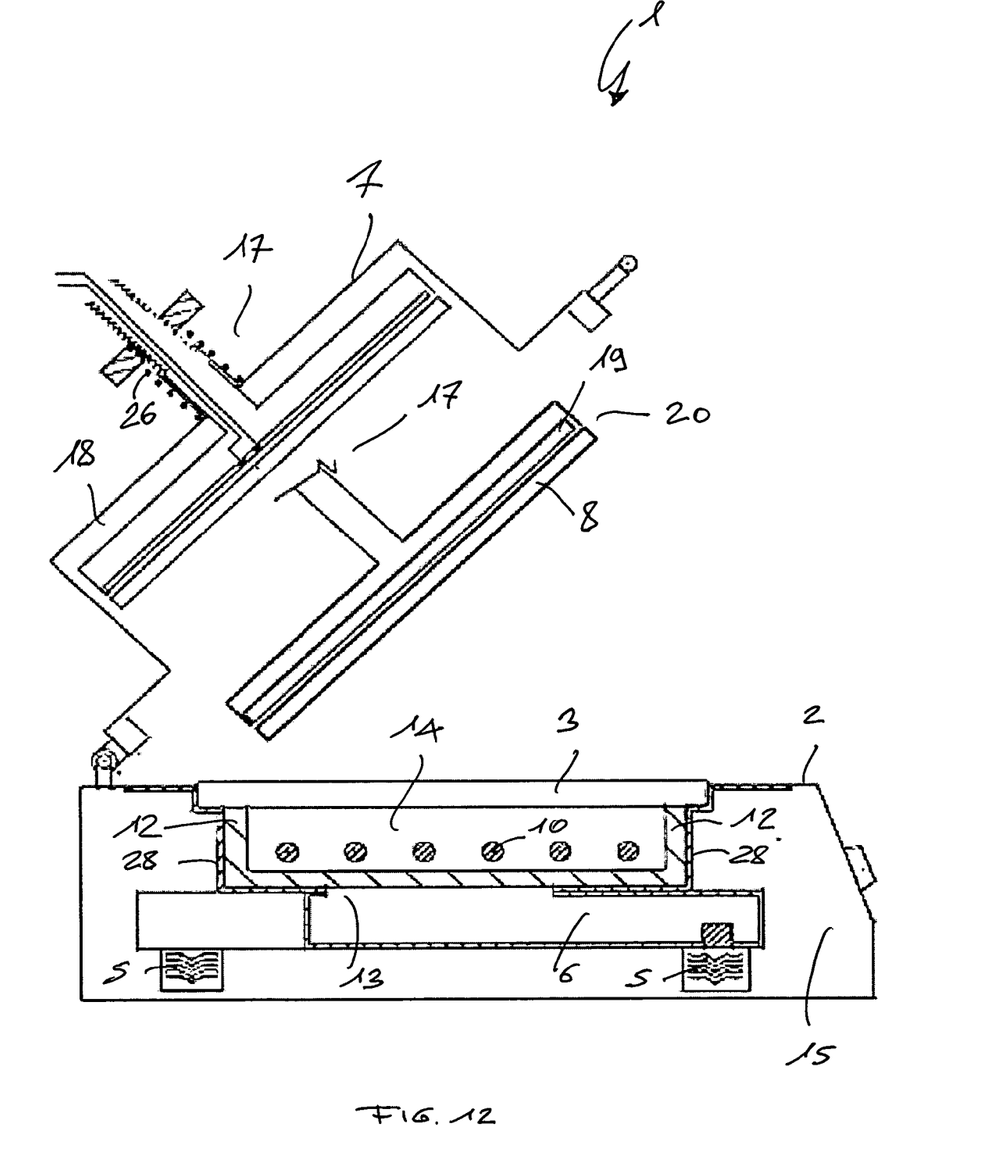
FIG. 12 is a view similar to FIG. 11, the apparatus being in open condition.

The upper member 7 substantially defines an internal portion or inner housing 18 wherein the food-contact heating surface 8 is movably arranged to fit the various food product sizes. When the upper member 7 is lifted from the base member 2, the moving coupling 17 allows the food-contact heating surface 8 to move outside the inner housing 18, as shown in FIGS. 8, 10, 12, so that the inner housing 18 is fully accessible to be cleaned.

In a preferred embodiment of the present invention, the food-contact heating surface 8 comprises a glass ceramic or aluminium or iron or cast-iron plate adapted to contact the upper portion of the food products to be cooked and the upper member 7 comprises a heating element 19 adapted to heat food-contact heating surface 8.

The heating element 19 is associated to the food-contact heating surface 8 so as to form a rigid and firmly joined assembly 20 movable to fit the various food product sizes and to be displaced to the extract position so that the internal portion 18 is accessible from outside to be cleaned as previously described.

It can be readily appreciated that the heating element 19 can be provided in the form of electrically conductive layers in contact with the food-contact heating surface 8.

Figure 7:
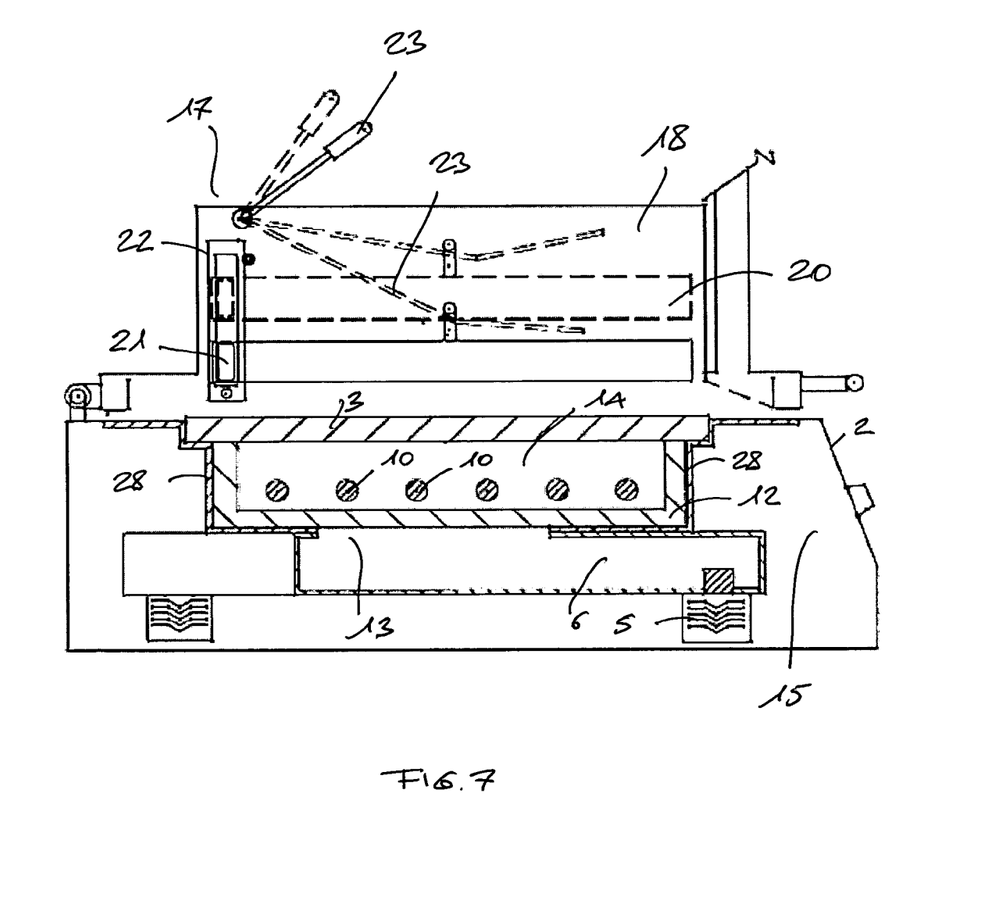
FIG. 7 is a lateral sectional view of the apparatus according to the present invention showing the moving coupling.

Advantageously, the food-contact surface 8 can be coated with a non-stick layer, for example Teflon, to improve cleanability According to a first embodiment of the present invention, represented in FIGS. 7 and 8, the moving coupling 17 can comprises, for example, a sliding coupling for enabling the assembly 20 to move up and down relative to the upper member 7. The sliding coupling includes sliding arms 21 provided on the assembly 20 for slidably engaging respective guides 22 provided on the upper member 7.

As a result, when the upper member 7 is lowered, the food-contact heating surface 8 is moved into contact with the corresponding portion of the food product to be cooked, thereby pressing it slightly due to the weight of assembly.

In the case that the so obtained pressing effect upon the food product proves to be too limited, i.e. inadequate, in order to ensure that the food-contact surface 8 is able to automatically be brought or caused to adequately press against and firmly stabilize upon the upper portion of the food product, it is possible for such pressure to be increased through the application of elastic elements.

The guides 22 are pivoted to the upper member 7 so that a rotation of the guides, when the upper member 7 is in open inoperative condition, causes the assembly 20 to be partially removed from the upper member 7 with the result that the inner housing 18 is accessible from outside to be cleaned.

Thank to such a rotation the assembly 20 comes to lie in the extract position wherein the food-contact heating surface 8 and the associated heating element 19 are taken out from the inner housing 18 of the upper member 7.

Further, the moving coupling 17 comprise a lever 23 rotatably associated to the upper member 7 and connected to the assembly 20.

The lever 23 is adapted to be operated by a user/operator for raising the assembly 20 up to a pre-determined height, so as to position it above the food product to be treated according at a desired distance therefrom.

The lever 23 is, also, adapted, to actuate the assembly 20 for causing the rotation of the guides 22 so that the assembly 20 is moved into the extraction position.

Figure 9:
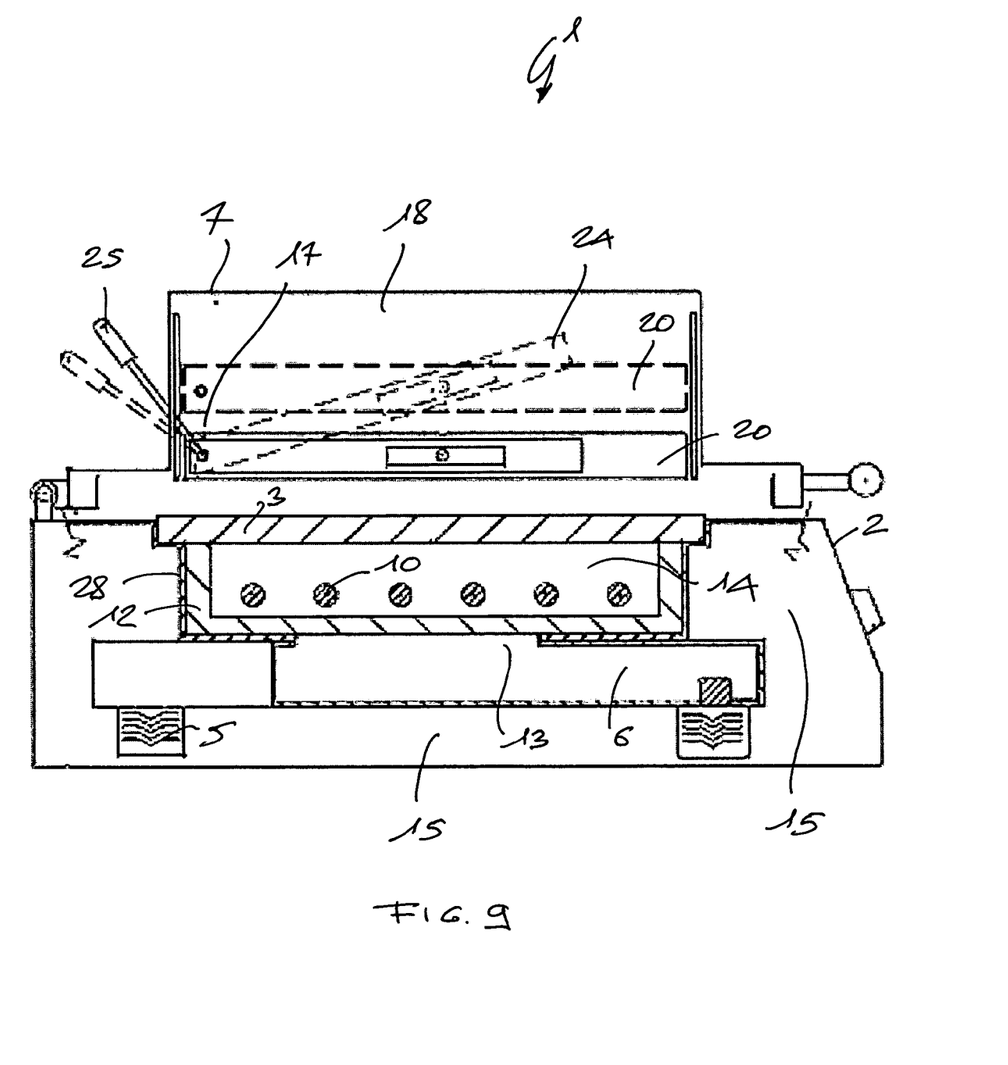
FIG. 9 is a lateral sectional view of the apparatus according to the present invention showing a further embodiment of the moving coupling.

In a further embodiment the moving coupling 17, shown in FIGS. 9 and 10, comprises a frame 24 pivoted to the upper member 7 and a lever arm 25 connected to the frame and operable by the user for driving the frame 24 into rotation. The assembly 20 is in turn pivoted to the frame 24 so as to freely rotate with respect to the latter. By means of the lever arm 25 it is possible to lift the frame 24 and the assembly 20 according to the height of the food product to be cooked. The rotation of the assembly 20 with respect to the frame 24 enables the food-contact heating surface 8 to better fit the size of the food product.

The lever arm 25 is adapted to rotate the frame 24 so that the assembly 20 is moved into the extraction position.

Figure 11:
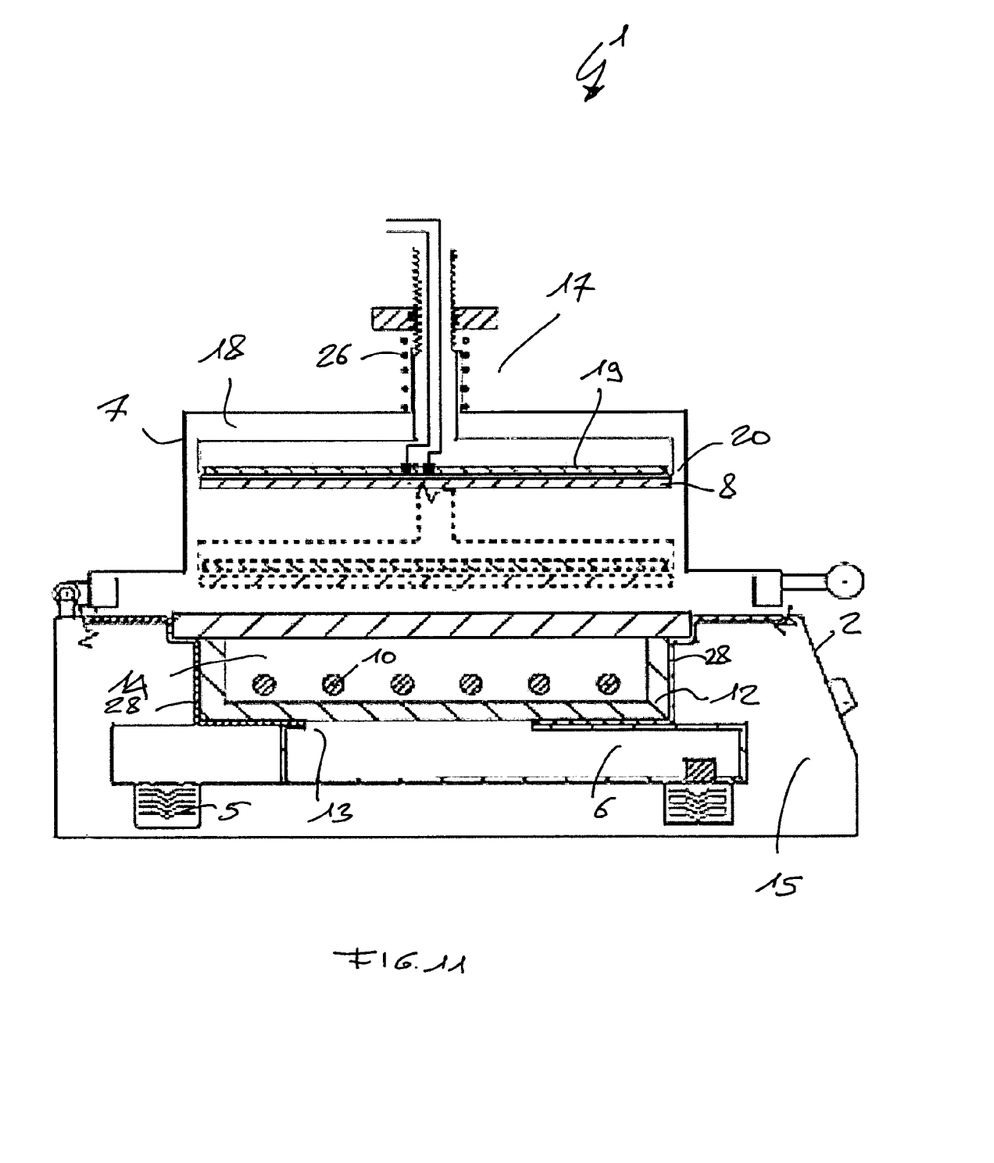
FIG. 11 is a lateral sectional view of the apparatus according to the present invention showing a further embodiment of the moving coupling.

In a further embodiment of the present invention, represented in FIGS. 11 and 12, the moving coupling 17 comprises a telescopic mechanism through which the assembly 20 is movably associated to the upper member 7 to move into positions at different height from the food-support surface 3 in accordance with the varying size of the food product to be cooked.

A helical spring 26 can be provided to bias and stabilize the assembly 20 and hence the food-contact heating surface 8 against the food product.

When the upper member 7 is raised from the base member 2, the telescopic mechanism enables the assembly 20 to move into the extraction position, wherein the latter is taken out or partially removed from the upper member 7, so that the inner housing 18 is accessible from outside to be cleaned Conclusively, it can therefore be stated that apparatus for cooking food products on both sides thereof according to the present invention is capable of efficiently and effectively cooking the food products involved, without affecting the taste and flavour thereof.

A particular advantage of the apparatus according to the present invention is the ability thereof to allow for extremely short cooking times, while doing away with the risk for the food products being handled to get scorched.

Another advantage of the apparatus according to the present invention derives from the ability thereof to enable most variously sized food products to be cooked there, thanks to the top heating surface thereof being adjustable.

Another advantage of the apparatus according to the present invention derives from the fact that the moving coupling render the internal portion of the upper member accessible from outside to be cleaned.

The invention claimed is:

1. An apparatus for cooking food products on both sides thereof, including: a base member (2) comprising a food-support surface (3) transparent to both microwave and infrared radiation, an electric heating device (4) and at least one microwave generator (5), said microwave generator (5) being connected to a waveguide cavity (6) for irradiating the food products, an upper member (7) comprising a food-contact heating surface (8) and adapted to close in onto the base member (2) so as to form a cooking chamber (9) enclosing said surfaces (3,8) and capable to retaining the microwaves therewithin, characterized in that the electric heating device (4) comprises at least one shielded resistor (10) having the external shield (11) electrically connected to ground, said apparatus comprises a partition element (12) made of thermal-insulating and microwave-transparent material, at least a portion of said partition element (12) being arranged in a position below the shielded resistor (10) for separating the latter from the microwave generator (5), the waveguide cavity (6) comprises a microwave launch aperture (13) arranged underneath the partition element (12), through which the microwaves are adapted to exit the cavity (6) to pass through the partition element (12), the shielded resistor (10), the food-support surface (3) and radiate into the cooking chamber (9).

2. An apparatus according to claim 1, wherein said partition element (12) divides the inside of the base member (2) into a first area defining an infrared radiation area (14) wherein the shielded resistor (10) is located and into a second area (15) wherein the microwave generator (5) and other electric/electronic components of the apparatus are arranged, in order to reduce the heat losses from the infrared radiation area (14) and at the same time to convey the heat generated by the shielded resistor (10) towards the food-support surface (3).

3. An apparatus according to claim 1, wherein said partition element (12) defines a housing adapted to contain the shielded resistor (10).

4. An apparatus according to claim 3, wherein said partition element(12) is configured as a box-like container in which the shielded resistor (10) is arranged, the box-like container is open upwards and arranged so that the food-support surface (3) substantially closes the open side of the box-like container so that the food-support surface (3) and the box-like container delimit the infrared radiation area (14) enclosing the shielded resistor (10).

5. An apparatus according to claim 4, wherein the microwave launch aperture (13) faces and it is arranged under a bottom wall of the box-like container.

6. An apparatus according to claim 2, wherein a microwave reflector (28) is provided between the microwave launch aperture (13) and the food-support surface (3), around the box-like container of the partition element (12), in order to prevent the microwaves exiting the cavity (6) from propagating into the second area (15) thereby protecting the electric/electronic components housed in the base member (2).

7. An apparatus according to claim 6, wherein said microwave reflector (28) encompasses the side walls of the box-like container and it is open downwards so as to define a bottom opening connected to the microwave launch aperture (13).

8. An apparatus according claim 1, wherein said waveguide cavity (6) is configured as a box-shaped casing having internal dimensions appropriately sized so as to drive the microwaves generated by a magnetron generator.

9. An apparatus according to claim 8, wherein two waveguide cavities (6), each one connected to a magnetron generator, are provided in the base member (2) and they are arranged sideways one respect to the other with each microwave launch aperture (13) extending in a position below the partition element (12).

10. An apparatus according to claim 1, wherein said waveguide cavity (6) is in the shape of substantially a funnel having a tapered portion coupled to the microwave generator and a flared portion opened at the top so as to define the microwave launch aperture (13), through which the microwaves are able to exit the waveguide cavity (6) to pass through the partition element (12), the shielded resistor (10) and the food-support surface (3).

11. An apparatus according to claim 1, wherein temperature sensors (16) are provided in contact to a bottom face (3a) of the food-support surface (3), i.e. in contact to the face opposite to the one adapted to support the food, for detecting the temperature variations, which are generated by the food when it is placed on the hot food-support surface (3) in order to maintain the cooking.

12. An apparatus according to claim 1, wherein the food-contact heating surface (8) is movably associated to the upper member (7) by means of a moving coupling (17) enabling the food-contact heating surface (8) to move relative to the upper member (7), as to be displaced into positions at different height from the food-support surface (3) in accordance with the size of the food products to be cooked each time.

13. An apparatus according to claim 12, wherein, when the upper member (7) is in an open inoperative condition, said moving coupling (17) enables the food-contact heating surface (8) to move into an extraction position in which the latter is taken out or spaced from the upper member (2) so that an inner housing (18) of the upper member (2) adapted to contain the food-contact heating surface (8) is accessible from the outside to be cleaned.

14. An apparatus according to claim 13, wherein said the moving coupling (17) comprises a sliding coupling for enabling the food-contact heating surface (8) to move up and down relative to the upper member (7), said sliding coupling includes sliding arms (21) associated to the food-contact heating surface (8) for slidably engaging respective guides (22) provided on the upper member (7).

15. An apparatus according to claim 14, wherein said guides (22) are pivoted to the upper member so that a rotation of the guides, when the upper member (7) is in the open inoperative condition, causes the food-contact heating surface (8) to be displaced into said extraction position.

16. An apparatus according to claim 15, wherein the moving coupling (17) comprise a lever (23) rotatably associated to the upper member (7) and connected to the food-contact heating surface (8), the lever (23) is adapted to actuate the food-contact heating surface (8) for causing the rotation of the guides (22) so that the food-contact heating surface (8) is moved into the extraction position.

17. An apparatus according to claim 13, wherein the moving coupling (17) comprises a frame (24) pivoted to the upper member (7) and a lever arm (25) connected to the frame (24) and operable by the user for driving the frame (24) into rotation, the food-contact heating surface (8) is in turn pivoted to the frame (24) so as to freely rotate with respect to the latter, said lever arm (25) is adapted to rotate the frame (24) so that the food-contact heating surface (8) is moved into the extraction position.

18. An apparatus according to claim 13, wherein the moving coupling (17) comprises a telescopic mechanism through which the food-contact heating surface (8) is movably associated to the upper member (7) to move into positions at different height from the food-support surface (3) in accordance with the varying size of the food products (4) to be cooked, when the upper member (7) is raised from the base member (2), i.e. in the open inoperative condition, the telescopic mechanism enables the food-contact heating surface (8) to move into the extraction position.

19. An apparatus according to claim 1, wherein the upper member (7) comprises a heating device (19) associated to the food-contact heating surface (8) so as to form a rigid and firmly joined assembly (20) movable to fit the various food product sizes and to be displaced to the extract position so that the inner housing (18) is accessible from outside to be cleaned.

* * * * *